(12) United States Patent　　　(10) Patent No.:　　US 12,632,558 B2
　　　Ballard et al.　　　　　　　　(45) Date of Patent:　　　May 19, 2026

(54) SECURING LEGACY ADAPTERS WITH A SECURE MICROCONTROLLER UNIT AND LEGACY ADAPTER RECOVERY

(71) Applicant: DELL PRODUCTS L.P., Round Rock, TX (US)

(72) Inventors: Lee E. Ballard, Georgetown, TX (US); Jason B. Kilpatrick, Austin, TX (US); Jonathan Foster Lewis, Round Rock, TX (US); Jason Christopher Rock, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 18/640,903

(22) Filed: Apr. 19, 2024

(65) Prior Publication Data

US 2025/0328647 A1　　Oct. 23, 2025

(51) Int. Cl.
　　*G06F 21/57*　　　　(2013.01)
(52) U.S. Cl.
　　CPC ...... *G06F 21/572* (2013.01); *G06F 2221/033* (2013.01)
(58) Field of Classification Search
　　CPC ...... G06F 21/575; G06F 21/572; G06F 21/44;
　　　　　　G06F 21/57; G06F 21/70; G06F 11/1417;
　　　　　　　　　　　　　　　G06F 2221/033
　　See application file for complete search history.

(56) References Cited

U.S. PATENT DOCUMENTS

| 10,614,005 B1 * | 4/2020 | Villano | G06F 13/20 |
| 10,860,305 B1 * | 12/2020 | Harland | H03K 19/177 |

| 10,970,232 B2 | 4/2021 | Halpern | |
| 11,698,969 B1 * | 7/2023 | Henriquez Garcia | G06F 21/572 726/23 |
| 2009/0096481 A1 * | 4/2009 | Butter | G06F 30/34 326/38 |
| 2018/0121656 A1 * | 5/2018 | Scherer, III | G06F 21/575 |
| 2018/0165455 A1 * | 6/2018 | Liguori | G06F 21/57 |
| 2019/0073478 A1 * | 3/2019 | Khessib | G06F 13/4282 |
| 2019/0102576 A1 * | 4/2019 | Pope | G06F 21/602 |
| 2020/0034541 A1 * | 1/2020 | Ballard | G06F 8/654 |
| 2020/0193029 A1 * | 6/2020 | Liu | H04L 9/3234 |
| 2020/0201714 A1 * | 6/2020 | Montero | G06F 11/1469 |
| 2020/0218597 A1 * | 7/2020 | Itkin | G06F 11/1004 |
| 2021/0034733 A1 * | 2/2021 | Grobelny | G06F 21/44 |
| 2021/0365558 A1 * | 11/2021 | Samuel | G06F 21/602 |
| 2022/0060339 A1 * | 2/2022 | Ballard | H04L 9/0643 |
| 2022/0179960 A1 * | 6/2022 | Spangler | H04L 9/3239 |
| 2022/0292203 A1 * | 9/2022 | Severns-Williams | G06F 21/57 |
| 2023/0020838 A1 * | 1/2023 | Volos | G06F 9/4405 |
| 2023/0072351 A1 | 3/2023 | Chien et al. | |

(Continued)

OTHER PUBLICATIONS

Yao, Jiewen, Krystian Matusiewicz, and Vincent Zimmer. "Post quantum design in SPDM for device authentication and key establishment." Cryptography 6.4 (2022): 48. (Year: 2022).*

*Primary Examiner* — Michael Simitoski

(74) *Attorney, Agent, or Firm* — Larson Newman, LLP

(57) ABSTRACT

An adapter provides an expansion function to an information handling system. The adapter includes an adapter application specific integrated circuit (ASIC), a memory device, and a control unit. The adapter ASIC provides the expansion function. The memory device stores firmware for the adapter ASIC. The control unit validates the firmware.

18 Claims, 4 Drawing Sheets

(56)  References Cited

U.S. PATENT DOCUMENTS

| | | | |
|---|---|---|---|
| 2023/0121492 A1* | 4/2023 | Qiu | G06F 21/572 |
| | | | 726/22 |
| 2024/0184890 A1* | 6/2024 | Agarwal | G06F 21/44 |
| 2024/0303339 A1* | 9/2024 | Paulraj | H04L 9/3268 |
| 2025/0258964 A1* | 8/2025 | Rajgor | G06F 21/87 |

* cited by examiner

SECURING LEGACY ADAPTERS WITH A SECURE MICROCONTROLLER UNIT AND LEGACY ADAPTER RECOVERY

FIELD OF THE DISCLOSURE

This disclosure generally relates to information handling systems, and more particularly relates to securing legacy adapters with a secure microcontroller unit (MCU) and legacy adapter recovery in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An adapter may provide an expansion function to an information handling system. The adapter may include an adapter application specific integrated circuit (ASIC), a memory device, and a control unit. The adapter ASIC may provide the expansion function. The memory device may store firmware for the adapter ASIC. The control unit may validate the firmware.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
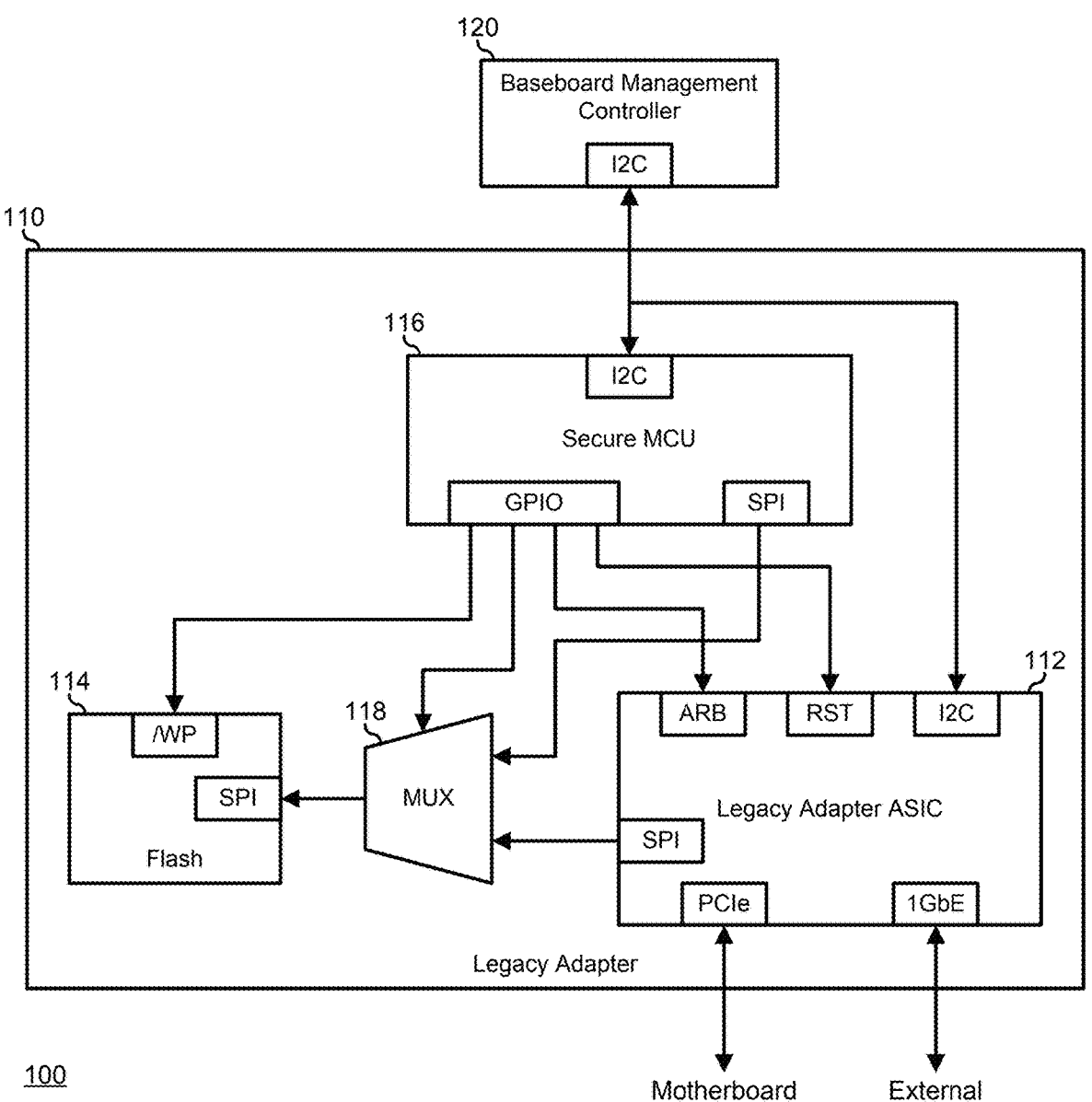
FIG. 1 is a block diagram illustrating an information handling system according to an embodiment of the present disclosure.

FIG. 1 illustrates an information handling system 100 including an adapter device 110 and a baseboard management controller 120. Adapter device 110 represents an add-in device in information handling system 100 that provides additional functionality to the information handling system, above and beyond the capabilities of a motherboard of the information handling system. For illustrative purposes, adapter device 110 is illustrated as having a two (2) high-speed data communication interfaces; a PCIe interface, and a one gigabit Ethernet (1 GbE) interface. For example adapter device 110 can be installed into information handling system 100 by plugging the adapter device into a PCIe connector socket of the motherboard of the information handling system, thereby adding 1 GbE connectivity to the information handling system. Adapter device 110 is shown as a legacy adapter in that the functionality that is added to information handling system 100 may not necessarily be deemed to be a leading-edge functionality For example, adapter device 110 is illustrated as adding 1 GbE connectivity, while leading-edge Ethernet functionality may be understood to be at 100 Gb (100 GbE) speeds or higher.

It has been understood by the inventors of the current disclosure that the security standards and algorithms utilized to implement a hardware root of trust (HW ROT) for firmware used by adapter devices is evolving rapidly. For example, the Commercial National Security Algorithm (CNSA) suite of cryptographic algorithms was promulgated as the CNSA 1.0 level in 2015, and a completely revised CNSA 2.0 level was promulgated in 2022. Similarly, the Security Protocol and Data Model (SPDM) standard was released at a SPDM 1.0 level in late-2019, and has undergone multiple revisions to the current SPDM 1.3 level in mid-2023. Likewise, the Device Identifier Component Engine (DICE) standard was introduced around 2019. Modern adapter application specific integrated circuits (ASICs) that implement the leading-edge functionality are typically expected to incorporate functions that implement these and other standards into their designs to protect the firmware on the flash memory devices of the adapter.

However with regard to legacy functionality, the design of the implementing ASICs is typically decades old. For example, in the case shown in FIG. 1, 1 GbE was introduced in 1998, and the commercial case for updating 1 GbE ASICs to incorporate the latest security standards and tools is negligible, and even where legacy device ASICs have been updated, the tools needed to implement the latest security standards are not typically scalable across multiple vendors and interface types. Other solutions may include adding a secure microcontroller unit (sMCU) on the adapter add-in card between the device ASIC Serial Peripheral Interface

3

(SPI) and the firmware flash memory device. Such a solution typically involves adding a separate flash memory device to support protection and recovery. Thus the addition of a sMCU between the device ASIC SPI and the firmware flash memory device adds the cost of the sMCU and the associated flash memory device. Further, the implementation of the SPDM standard necessitates changes to the device ASIC firmware to support the enhanced security functionality. Thus there remains a need to provide a more cost-effective solution to enhance the security of legacy adapters without necessitating extensive firmware updates to the adapter firmware.

Returning to FIG. 1, in a particular embodiment, BMC 120 collaborates with a sMCU 116 of adapter device 110, where the sMCU supports the latest security standards and tools transparently from an adapter ASIC 112. As such, adapter device 110 includes adapter ASIC 112, a flash memory device 114, sMCU 116, and a multiplexor 118. Adapter ASIC 112 includes an Inter-Integrated Circuit (I2C) interface, a PCIe interface, a 1 GbE interface, a SPI interface, an arbitration input (ARB), and a reset input (RST). Flash memory device 114 includes a SPI interface and a write-protect input (/WP). SMCU 116 includes an I2C interface, a SPI interface, and four general purpose input/ output (GPIO) outputs. Multiplexor 118 includes two (2) inputs, one (1) output, and a selector input. The I2C interfaces of adapter ASIC 112, sMCU 116, and BMC 120 are connected together, where the adapter ASIC and the sMCU are configured as I2C endpoints. The SPI interfaces of adapter ASIC 112 and sMCU 116 are connected to selectable inputs of multiplexor 118, and an output of the multiplexor is connected to the SPI interface of flash memory device 114. The GPIO outputs of sMCU 116 are connected to the reset (RST) and arbitration (ARB) inputs of adapter ASIC 112, to the write-protect input (/WP) of flash memory device 114, and to a selector input of multiplexor 118.

BMC 120 detects that the I2C interface has multiple endpoints (i.e., adapter ASIC 112 and sMCU 116), and will address the adapter ASIC routine messaging with adapter device 110, such as for setting up the operation of the adapter device. In this way, adapter device 110 operates in its legacy configuration, and there remains no need to update the adapter firmware beyond the routine firmware updates for the adapter device. On the other hand, in managing the security of the firmware stored on flash memory device 114, BMC 116 will address sMCU 116. In particular, BMC 120 operates to route SPDM flows, such as Get Certificate commands, Challenge commands, Get measurement commands, or the like, to sMCU 116. In turn, sMCU 116 controls access to flash memory device 114, manages the HW ROT for adapter device 110, for example implementing a NIST 800-193 Root of Trust Detect function, and forces a firmware recovery operation when the HW ROT function fails. In another embodiment, BMC 120 operates to direct sMCU 116 to hold the write-protect (/WP) input to flash memory device 114 until the completion of the HW ROT function. In another embodiment, BMC 120 utilizes sMCU 116 as a Platform Level Data Model (PLDM) firmware update proxy to provide an out-of-band firmware recovery mechanism.

Figure 2:
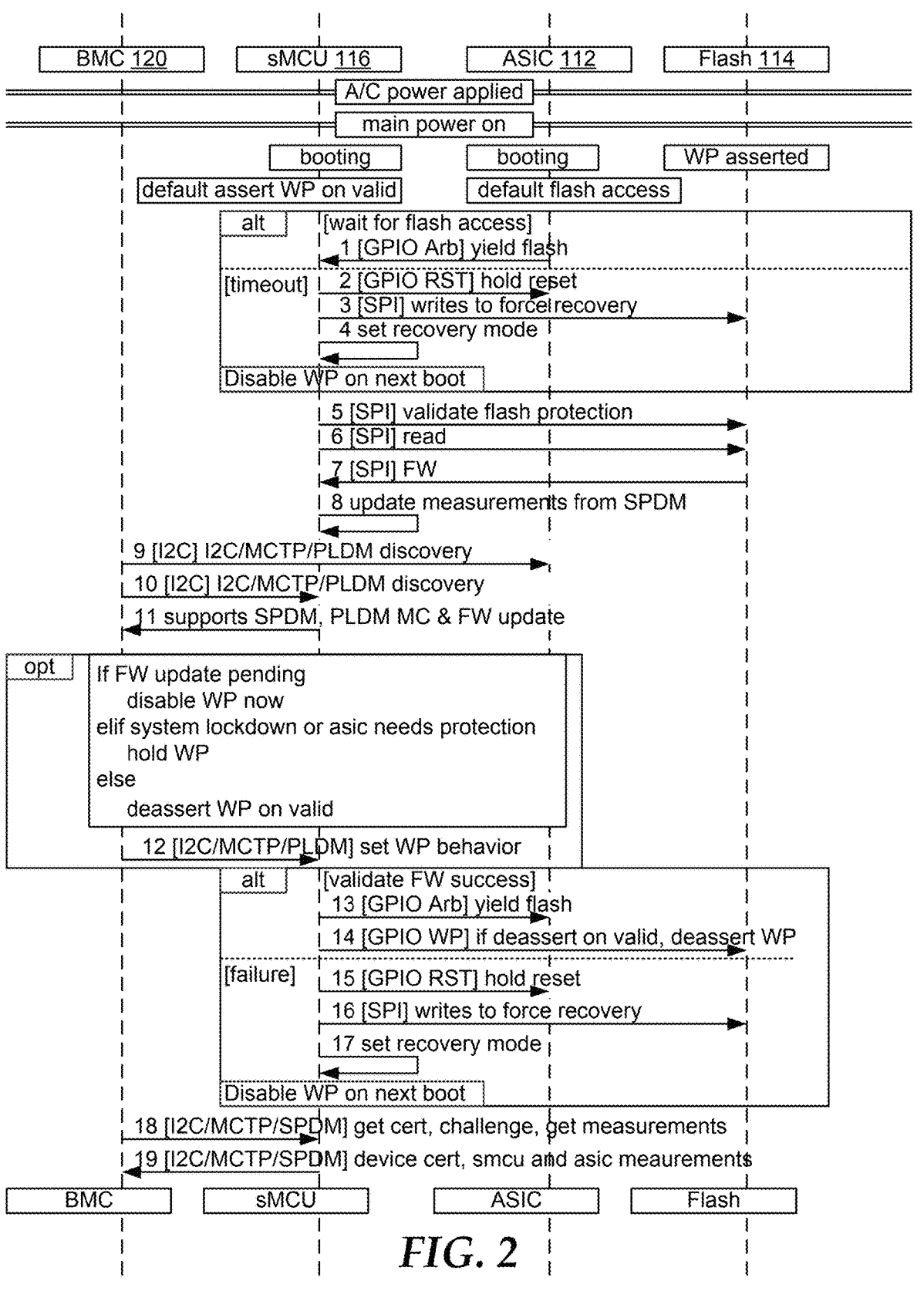
FIGS. 2 and 3 are flowcharts illustrating a method for securing legacy adapters with a secure microcontroller unit (MCU) and legacy adapter recovery in the information handling system of FIG. 1.

FIG. 2 illustrates a method for securing legacy adapters with a sMCU and legacy adapter recovery in information handling system 100. In particular, the method is directed to providing a secure boot with protection activities and measurement activities provided in parallel. The method illustrates the flow of activities of device ASIC 112, flash memory device 114, sMCU 116, and BMC 120. As preliminary activities to the method, the A/C power is applied to information handling system 100 and the main power is provided to adapter ASIC 112, flash memory device 114, sMCU 116, and BMC 120. Further, device ASIC 112 and sMCU 116 are booted and the write-protect input (/WP) is asserted to flash memory device 114. Following the boot activities, device ASIC 112 is set with default access to flash memory device 114, and sMCU 116 asserts the write-protect output (/WP).

In a first step 1 of the method, adapter ASIC 112 asserts the arbitration output (ARB), and device accesses the write-protected contents of flash memory device 114. Device ASIC 112 copies the contents of flash memory device 114, and notifies sMCU 116 when the copying process is completed by deasserting the arbitration output (ARB). This process may take several seconds. In a next set of steps, if sMCU 116 does not receive access to flash memory device 114 within a reasonable time, the sMCU asserts the reset output (RST) to reset ASIC device 112. With device ASIC 112 held in reset, sMCU 116 releases the write-protect output (/WP) and modifies the contents of flash memory device 114 to force the ASIC device into recovery on the next boot. Finally, sMCU 116 sets an internal recovery mode flag to release the write-protect output (/WP) on the next boot.

In step 5, when sMCU 116 gains access to flash memory device 114, the sMCU validates that the flash memory device configuration is correct, reads the contents of the flash memory device, and, after the flash memory device returns the contents (i.e., the adapter ASIC firmware), collects the necessary protection measurements from the contents to determine the validation state of the firmware, for example, utilizing the latest security standards and tools, as described above.

In step 9, in parallel with the above method steps, BMC 120 discovers adapter ASIC 112 and sMCU 116 on the I2C bus, and their associated capabilities The discovery may include discovery of I2C endpoints, Management Component Transport Protocol (MCTP) nodes, PLDM nodes, or the like. In response, sMCU 116 informs BMC 120 that the sMCU is capable of SPDM, PLDM monitor and control, and PLDM firmware updates. In a particular embodiment, BMC 120 optionally operates to direct sMCU 116 to alter the write-protect output (/WP) behavior, such as to direct sMCU to maintain the write-protect output (/WP), as needed or desired.

In step 13, after collecting the protection measurements for the firmware, sMCU 116 yields access to flash memory device 114 back to adapter ASIC 112 and, if the firmware is valid, deasserts the write-protect outout (/WP) to flash memory device 114. If the firmware validation fails, then at step 15, sMCU 116 asserts the reset output (RST) to reset ASIC device 112. With device ASIC 112 held in reset, sMCU 116 releases the write-protect output (/WP) and modifies the contents of flash memory device 114 to force the ASIC device into recovery on the next boot. Finally, sMCU 116 sets an internal recovery mode flag to release the write-protect output (/WP) on the next boot. Finally, in step 18, BMC 120 performs SPDM operations on adapter ASIC 112 through sMCU 116, and the sMCU replies to device SPDM requests.

Figure 3:
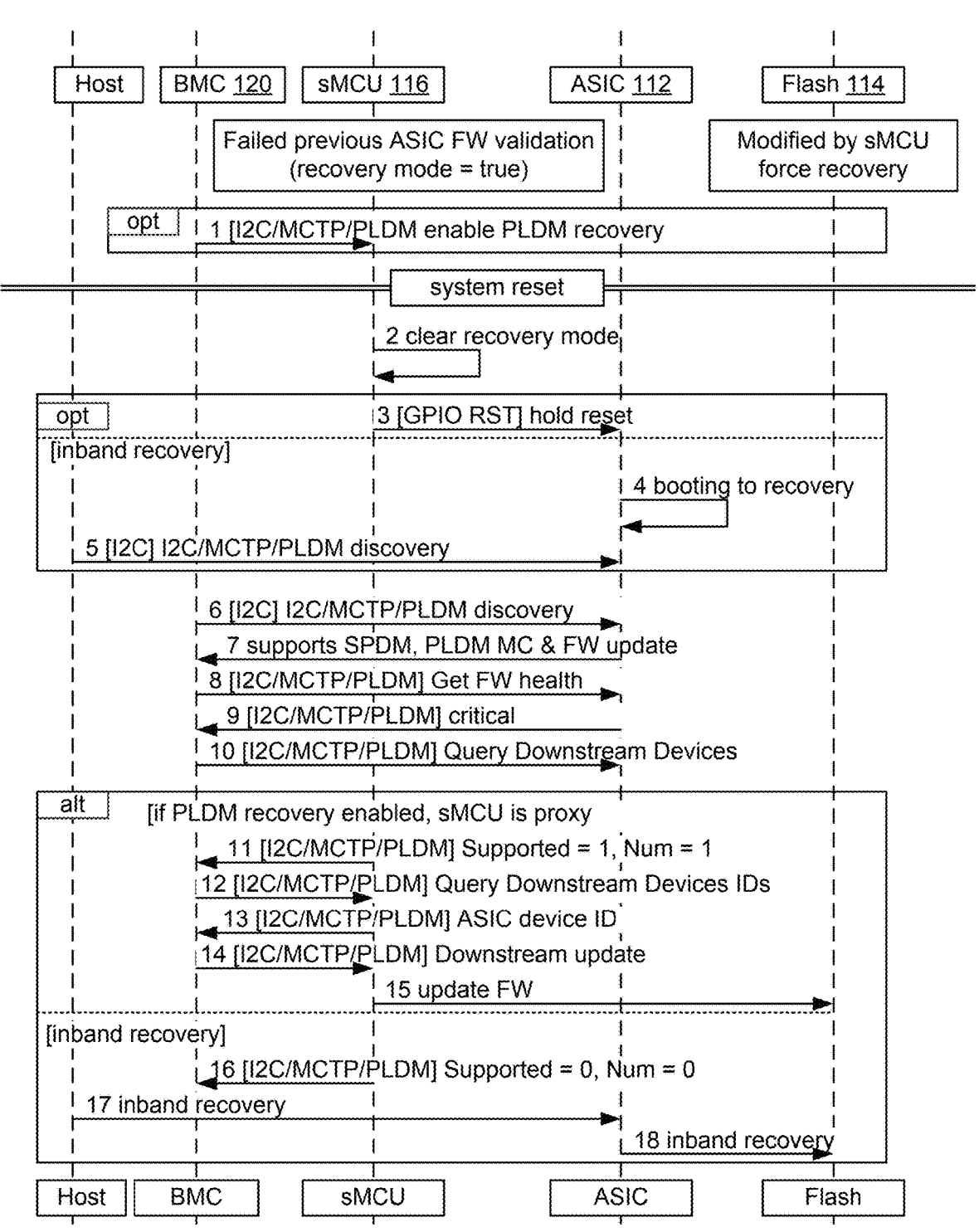

FIG. 3 illustrates a method for securing legacy adapters with a sMCU and legacy adapter recovery in information handling system 100. In particular, the method is directed to providing a secure boot with protection activities and measurement activities utilizing the sMCU as a PLDM proxy and to provide in-band recovery. As preliminary activities to the method, sMCU 116 asserts the write-protect output (/WP).

The default method for firmware recovery is for in-band recovery. Thus if out-of-band PLDM recovery is desired, the capability has to be separately enabled by BMC 120. Thus in step 1, BMC 120 enables PLDM recovery on sMCU 116. Information handling system 100 is then reset and sMCU 116 clears the recovery mode setting. An assumption may be made that the firmware will be recovered on the current boot, but if not, then the firmware will be detected as invalid on a subsequent boot and will be recovered on the next boot. In step 3 if sMCU 116 is configured for PLDM recovery, the sMCU will hold adapter ASIC 112 in reset in order to retain control of the flash. Otherwise, in step 4, adapter ASIC 112 enters the in-band recovery mode.

In step 5, BMC 120 discovers adapter ASIC 112 and sMCU 116 on the I2C bus, and their associated capabilities The discovery may include discovery of I2C endpoints, Management Component Transport Protocol (MCTP) nodes, PLDM nodes, or the like. In response, sMCU 116 informs BMC 120 that the sMCU is capable of SPDM, PLDM monitor and control, and PLDM firmware updates. In step 8, BMC 120 queries sMCU 116 as to the state of the firmware, and the sMCU reports that the firmware is in critical health. In step 10, BMC 120 queries sMCU 118 to direct the sMCU to perform the PLDM downstream device firmware update.

If PLDM recovery enabled sMCU 112 report there is a downstream device. Then BMC 120 queries sMCU 118 for the downstream device identifier and the sMCY returns the identifier for adapter ASIC 112. In response, BMC 120 pushes the firmware update to sMCU 116 via PLDM downstream update, and the sMCU utilizes its knowledge of ASIC firmware layout in flash memory device 114 to perform update. On the other hand, if PLDM update not supported or not enabled, then sMCU 116 reports that PLDM update is not supported and that there are zero (0) downstream devices to BMC 120, and adapter ASIC 112 utilizes in-band recovery tools to update the firmware in flash memory device 114.

Figure 4:
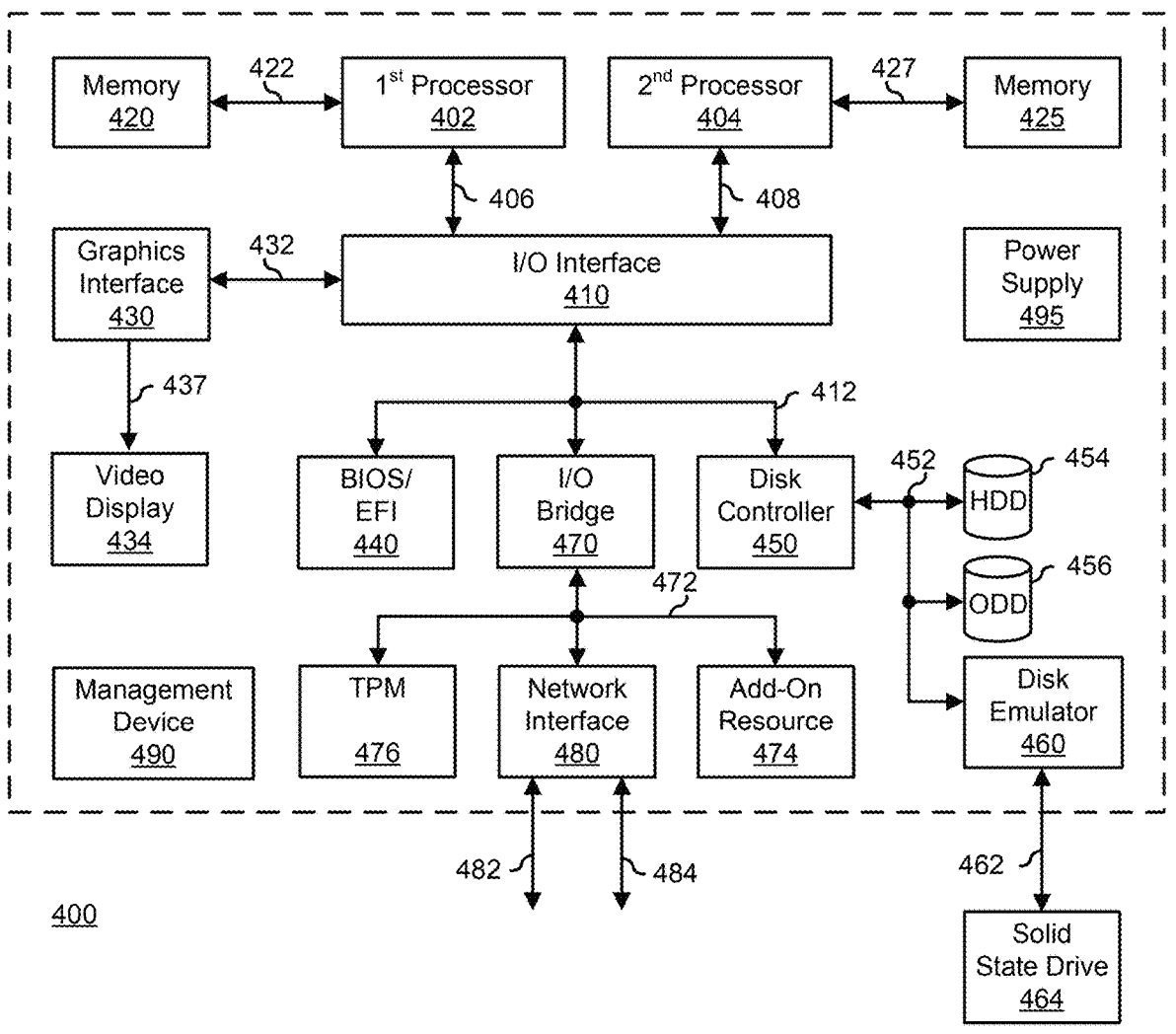
FIG. 4 is a block diagram illustrating a generalized information handling system according to another embodiment of the present disclosure.

FIG. 4 illustrates a generalized embodiment of an information handling system 400 similar to information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O)

devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 where peripheral interface 472 and the I/O channel are of the same type, and the I/O bridge translates information from a format suitable to the I/O channel to a format suitable to the peripheral channel 472 where they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 where the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An adapter to provide an expansion function to an information handling system, the adapter comprising:
    an adapter application specific integrated circuit (ASIC) configured to provide the expansion function;
    a memory device to store firmware for the adapter ASIC;
    a control unit configured to validate the firmware; and
    a multiplexor including a first input coupled to a first Serial Peripheral Interface (SPI) module of the adapter ASIC, a second input coupled to a second SPI module of the control unit, and an output coupled to a third SPI module of the memory device, the multiplexor configured to selectively grant access to the third SPI module to one of the first SPI module and the second SPI module;
    wherein, prior to validating the firmware, the multiplexor couples the first input to the output, and the control unit asserts a write-protect signal to the memory device.

2. The adapter of claim 1, wherein in validating the firmware, the control unit is further configured to validate the firmware based on a security standard promulgated after a development date of the adapter ASIC.

3. The adapter of claim 1, wherein the control unit controls access by the adapter ASIC to the memory device.

4. The adapter of claim 1, wherein the control unit is further configured to determine that the firmware is not validated, and in response to determining that the firmware is not validated, to reset the adapter ASIC.

5. The adaptor of claim 4, wherein, in further response to determining that the firmware is not validated, the control unit is further configured to perform a recovery operation on the firmware.

6. The adaptor of claim 1, wherein the control unit operates to validate the firmware in response to a Security Protocol and Data Model (SPDM) request.

7. A method comprising:

providing, on an adapter, an adapter application specific integrated circuit (ASIC) configured to provide an expansion function to an information handling system;

providing, on the adapter, a memory device to store firmware for the adapter ASIC;

providing, on the adapter, a control unit;

providing, on the adaptor, a multiplexor having a first input coupled to a first Serial Peripheral Interface (SPI) module of the adapter ASIC, a second input coupled to a second SPI module of the control unit, and an output coupled to a third SPI module of the memory device, the multiplexor configured to selectively grant access to the third SPI module to one of the first SPI module and the second SPI module;

coupling, by the multiplexor, the first input to the output;

asserting, by the control unit, a write-protect signal to the memory device; and validating, by the control unit, the firmware.

8. The method of claim 7, wherein in validating the firmware, the method further comprises validating, by the control unit, the firmware based on a security standard promulgated after a development date of the adapter ASIC.

9. The method of claim 7, further comprising controlling, by the control unit, access by the adapter ASIC to the memory device.

10. The method of claim 7, wherein the control unit operates to validate the firmware in response to a Security Protocol and Data Model (SPDM) request.

11. The method of claim 7, further comprising:

determining, by the control unit, that the firmware is not validated; and resetting, by the control unit, the adapter ASIC in response to determining that the firmware is not validated,.

12. The method of claim 11, wherein, in further response to determining that the firmware is not validated, the control unit is further configured to perform a recovery operation on the firmware.

13. An information handling system, comprising:

an adapter to provide an expansion function to the information handling system, the adapter including:

an adapter application specific integrated circuit (ASIC) configured to provide the expansion function;

a memory device to store firmware for the adapter ASIC;

a control unit configured to validate the firmware; and a multiplexor including a first input coupled to a first Serial Peripheral Interface (SPI) module of the adapter ASIC, a second input coupled to a second SPI module of the control unit, and an output coupled to a third SPI module of the memory device, the multiplexor configured to selectively grant access to the third SPI module to one of the first SPI module and the second SPI module, wherein, prior to validating the firmware, the multiplexor couples the first input to the output, and the control unit asserts a write-protect signal to the memory device; and a baseboard management controller coupled to the control unit and configured to direct the control unit to validate the firmware.

14. The information handling system of claim 13, wherein in validating the firmware, the control unit is further configured to validate the firmware based on a security standard promulgated after a development date of the adapter ASIC.

15. The information handling system of claim 13, wherein the control unit controls access by the adapter ASIC to the memory device.

16. The information handling system of claim 13, wherein the control unit operates to validate the firmware in response to a Security Protocol and Data Model (SPDM) request.

17. The information handling system of claim 13, wherein the control unit is further configured to determine that the firmware is not validated, and in response to determining that the firmware is not validated, to reset the adapter ASIC.

18. The information handling system of claim 17, wherein, in further response to determining that the firmware is not validated, the control unit is further configured to perform a recovery operation on the firmware.

* * * * *